United States Patent
Chen et al.

(10) Patent No.: US 7,616,740 B2
(45) Date of Patent: Nov. 10, 2009

(54) METHOD, SYSTEM, AND COMPUTER-READABLE MEDIUM FOR SIMULATING A CONVERGED NETWORK WITH A SINGLE MEDIA GATEWAY AND MEDIA GATEWAY CONTROLLER

(75) Inventors: Yong Tai Chen, Plano, TX (US); Jack C. Ger, Plano, TX (US); Yong He, Plano, TX (US)

(73) Assignee: Santera Systems, LLC, Plano, TX (US)

( * ) Notice: Subject to any disclaimer, the term of this patent is extended or adjusted under 35 U.S.C. 154(b) by 48 days.

(21) Appl. No.: 11/430,641

(22) Filed: May 9, 2006

(65) Prior Publication Data

US 2007/0263598 A1 Nov. 15, 2007

(51) Int. Cl.
*H04M 11/00* (2006.01)

(52) U.S. Cl. .................. 379/88.13; 379/1.01; 379/9; 379/10.01; 379/15.01; 379/15.05

(58) Field of Classification Search .............. 379/22, 379/26.01, 388.07, 1.01, 9, 10.01, 15.01, 379/15.05
See application file for complete search history.

(56) References Cited

U.S. PATENT DOCUMENTS

| 6,542,738 | B2* | 4/2003 | Keenan et al. | 455/424 |
| 7,124,335 | B2* | 10/2006 | Choi et al. | 714/712 |
| 2007/0143453 | A1* | 6/2007 | Huang | 709/220 |

* cited by examiner

*Primary Examiner*—Yosef K Laekemariam
(74) *Attorney, Agent, or Firm*—Jenkins, Wilson, Taylor & Hunt, P.A.

(57) ABSTRACT

A method, system, and computer-readable medium for emulating a converged network are provided. A media gateway receives a call at a first interface of a first network type. The call is processed for distribution on a second network type. The processed call is transmitted to a second interface of a second network type. A service module of the media gateway receives the processed call.

24 Claims, 12 Drawing Sheets

METHOD, SYSTEM, AND COMPUTER-READABLE MEDIUM FOR SIMULATING A CONVERGED NETWORK WITH A SINGLE MEDIA GATEWAY AND MEDIA GATEWAY CONTROLLER

BACKGROUND

As wireless and wireline networks converge and network configurations become increasingly complicated, realistic testing of end-to-end calls becomes more complicated and expensive. Networks may comprise any number of network entities that may, and typically are, manufactured by a wide variety of component manufacturers. Due to, among other reasons, the number of network components and network component costs, deployment of suitable network components in a test environment for evaluating one or more network entities or functions becomes prohibitively expensive and impractical.

Call testing in modern telecommunication systems is particularly problematic due to the fact that network systems may comprise components that are manufactured by multiple vendors. Depending on the routing complexity of a test call, deployment of a realistic test environment may be unfeasible. It is often prohibitively costly to acquire the requisite network components to realistically evaluate a particular network component or function.

BRIEF DESCRIPTION OF THE DRAWINGS

Aspects of the present disclosure are best understood from the following detailed description when read with the accompanying figures, in which.

DETAILED DESCRIPTION

Figure 1:
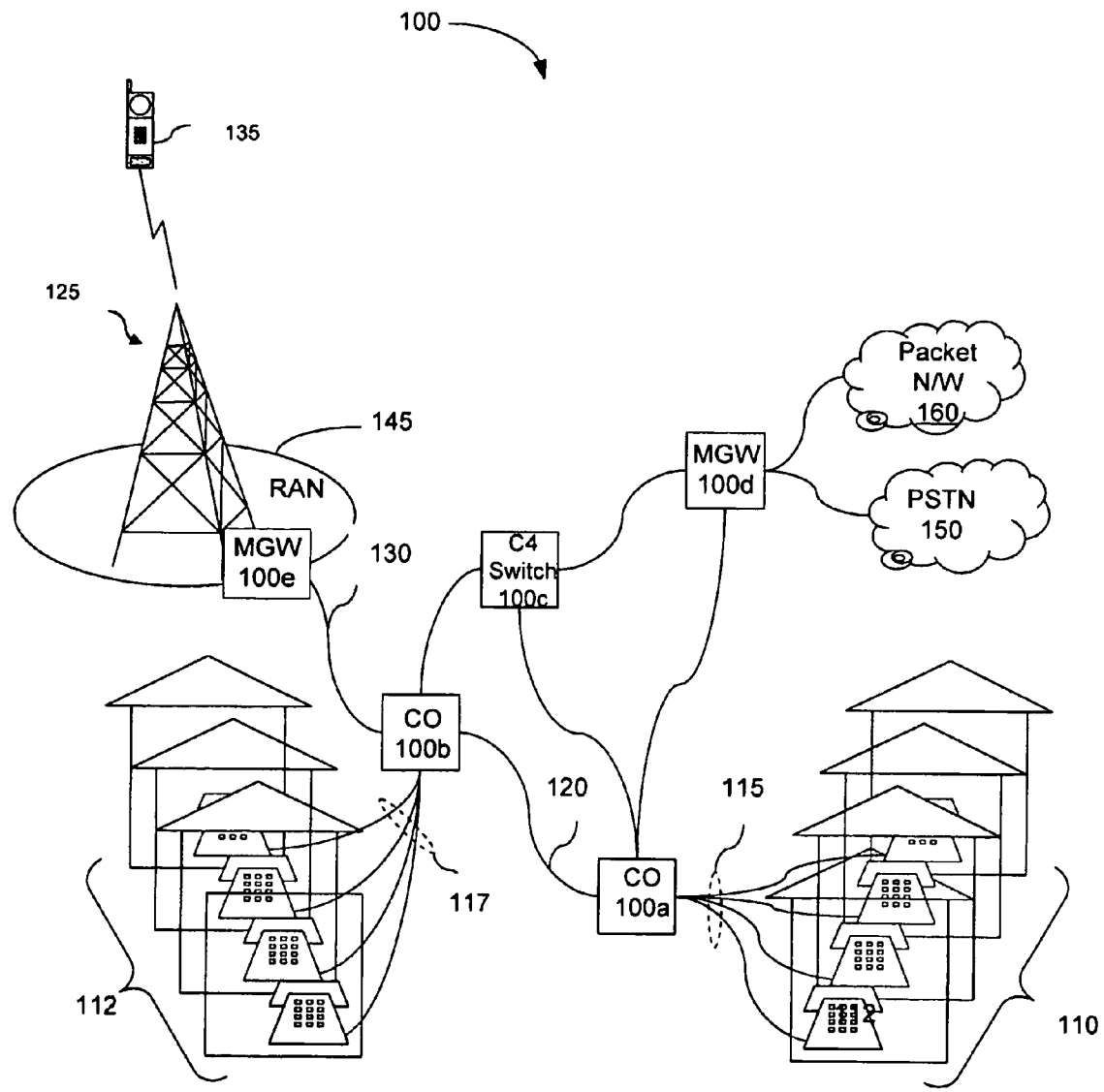
FIG. 1 is a diagrammatic representation of an embodiment of an exemplary network comprising wireless, wireline, and packet networks.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an embodiment of an exemplary network 100 comprising wireless, wireline, e.g., PSTN, and packet networks. Network 100 may include several networks and/or portions of networks. In the illustrative example, network 100 includes apparatus 100a-100e. Apparatus 100a is connected by a plurality of loops 115 to one or more PSTN access networks 110 that may include a plurality of residential telephones and/or business exchanges (PBXs). In one embodiment, the telephones may be grouped by digital loop carriers, PBXs, and/or other aggregators which may be included in one or more of the PSTN access networks 110, or may otherwise be configured to communicate with the apparatus 100a through PSTN access network 110. Loops 115 may include digital loops and/or analog loops, and may be configured to transmit TDM and other PSTN data, among others. Thus, apparatus 100a may be implemented as a Class 5 central office switch. Accordingly, any PSTN access network 110 connected to apparatus 100a may communicate with another PSTN access network 110 connected to apparatus 100a.

Apparatus 100a is also connected to apparatus 100b by a trunk or other transmission line 120. Apparatus 100b is, in turn, connected to a plurality of residential telephones, business PBXs, digital loop carriers, and/or PSTN access networks 112 (hereafter collectively referred to as PSTN access networks 112, although merely for the sake of simplicity) by a corresponding plurality of loops 117, which may each be substantially similar to one or more of loops 115. Thus, any of the PSTN access networks 110 may communicate with any of the PSTN access networks 112 via apparatus 100a and 100b, trunk 120, and corresponding ones of loops 115 and 117.

Apparatus 100c may aggregate traffic from any number of telecommunication nodes, such as apparatus 100a, 100b and 100d, and thus may be implemented as a Class 4 switch. Apparatus 100d may be implemented as a switching media gateway (MGW) for providing various switching services and media handling across various platforms. Accordingly, apparatus 100d may interface with one or more networks, such as PSTN 150 and packet network 160. Apparatus 100d may provide both Class 4 and Class 5 switching services and thus may aggregate traffic from other network entities, such as apparatus 100a and 100c, and may provide switching services to termination points in networks 150 and 160.

Additionally, network 100 may include a media gateway (MGW) 100e to interconnect a radio access network (RAN) 145 to one or more of access networks 110 and 112, PSTN 150, and packet network 160. RAN 145 may include a network controller (not shown) that is coupled with one or more base transceiver stations 125 that provide an over-the-air interface with one or more wireless mobile terminals 135. Conventional communications may traverse any one or more of wireless, wireline, and packet networks, and it is not uncommon for a call to cross all three types of networks.

Running test calls in a suitable test environment to evaluate new system components or functional upgrades of existing network infrastructure is often prohibitively expensive and may be practically unfeasible. For instance, assume it is desired to run a test call for a call service evaluation that would simulate a call originated from a terminal of PSTN access network 110 to a cellular telephone user terminated in RAN 145. In this instance, a test environment would require PSTN access network infrastructure, a Class 4 switching apparatus interfaced with another Class 4 or Class 5 switching apparatus, and a wireless media gateway. It is readily apparent that the logistics and monetary costs of deploying such a test environment are undesirable. However, deployment of a software package or product without thorough testing in a realistic network environment is undesirable.

Figure 2:
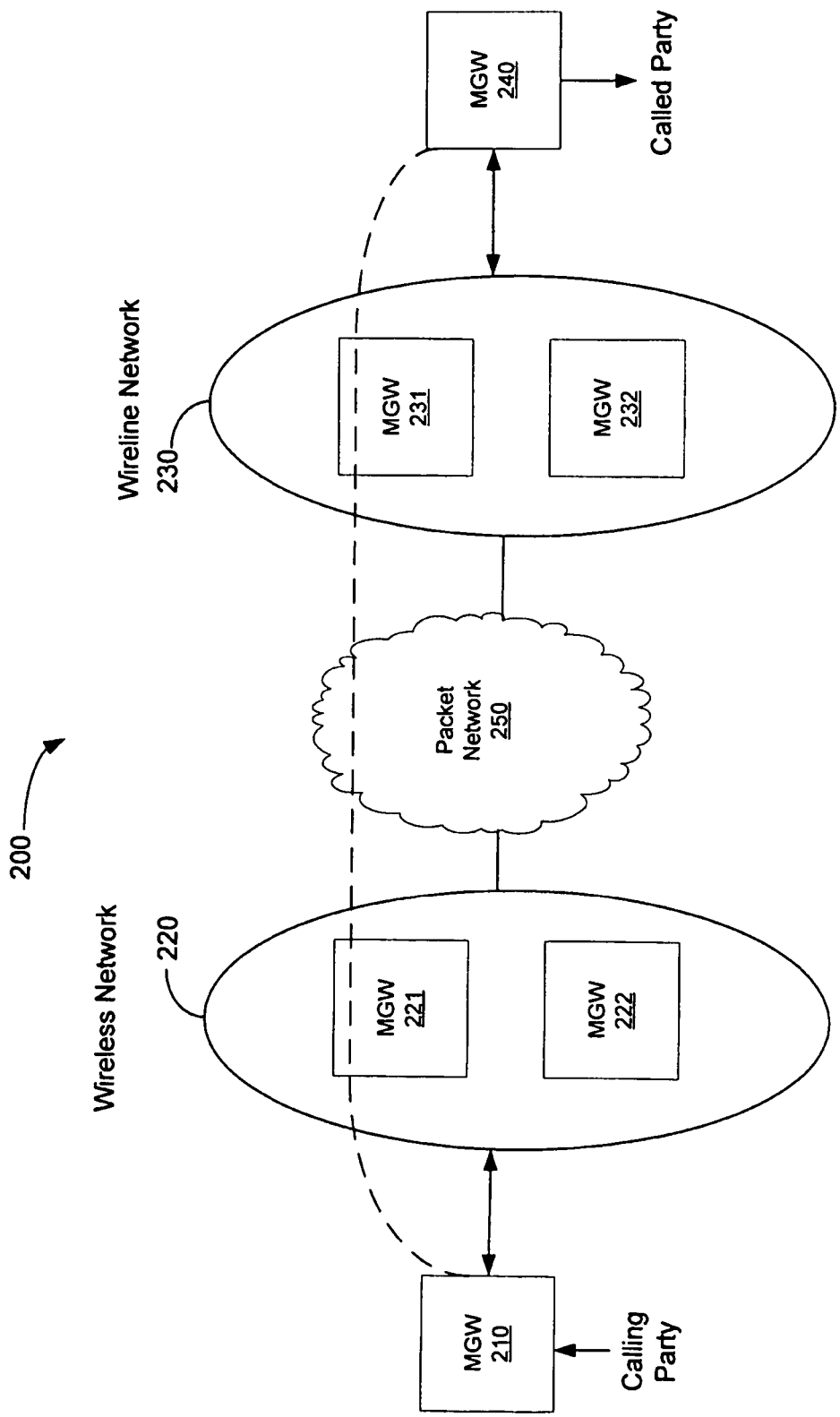
FIG. 2 is a diagrammatic representation of at least a portion of a network in which a test call may be evaluated in a conventional manner.

FIG. 2 is a diagrammatic representation of at least a portion of a network 200 in which a test call may be evaluated in a conventional manner. In the present example, a test call representative of a call originating from a wireless terminal to a wireline terminal is depicted. A call originates at a calling party that interfaces with a media gateway 210 and is destined for a called party that interfaces with a media gateway 240. In the present example, media gateway 210 is interconnected with a wireless network 220 that is, in turn, interconnected with a wireline network 230, such as the PSTN, via a packet network 250. Wireless network 220 may included various wireless network infrastructure, such as media gateways 221-222, and wireline network 230 may include various network infrastructure, such as media gateways 231-232. A realistic evaluation or test of bearer parameters and service features of end-to-end calls in such a service scenario would require deployment of four media gateway in a suitable test environment. Deployment of such a test environment by, for example, a telecommunication product vendor is undesirable.

In accordance with embodiments disclosed herein, a mechanism for emulating a network for testing and performance modeling is provided. Network emulation mechanisms disclosed herein provide for significant cost savings and facilitate development of robust network components in an economically and logistically feasible manner. In another embodiment, resources that are utilized for testing purposes do not require dedicated allocation for such purposes but, rather, may be shared with other applications. In other embodiments, emulation mechanisms are provided that allow for testing a part of a network in a highly configurable way such that different network configurations and different call characteristics with varying attributes may be evaluated.

In particular, a mechanism is provided for using a single media gateway and a gateway controller to emulate a wireless, wireline, and/or packet network in accordance with embodiments disclosed herein. A single media gateway, a media gateway controller, and a network emulation and test driver module (also referred to herein as a network emulator) are used to emulate a converged network for testing calls, call features, and network performance characteristics. The media gateway is used to emulate a converged network by providing bearer connections between interfaces of different network types with termination ports of different bearer characteristics. A media gateway controller provides call behaviors and control messages to the media gateway to implement network emulation. The network emulator is responsible for driving the emulation of a converged network and for driving test calls through the emulated network.

Figure 3:
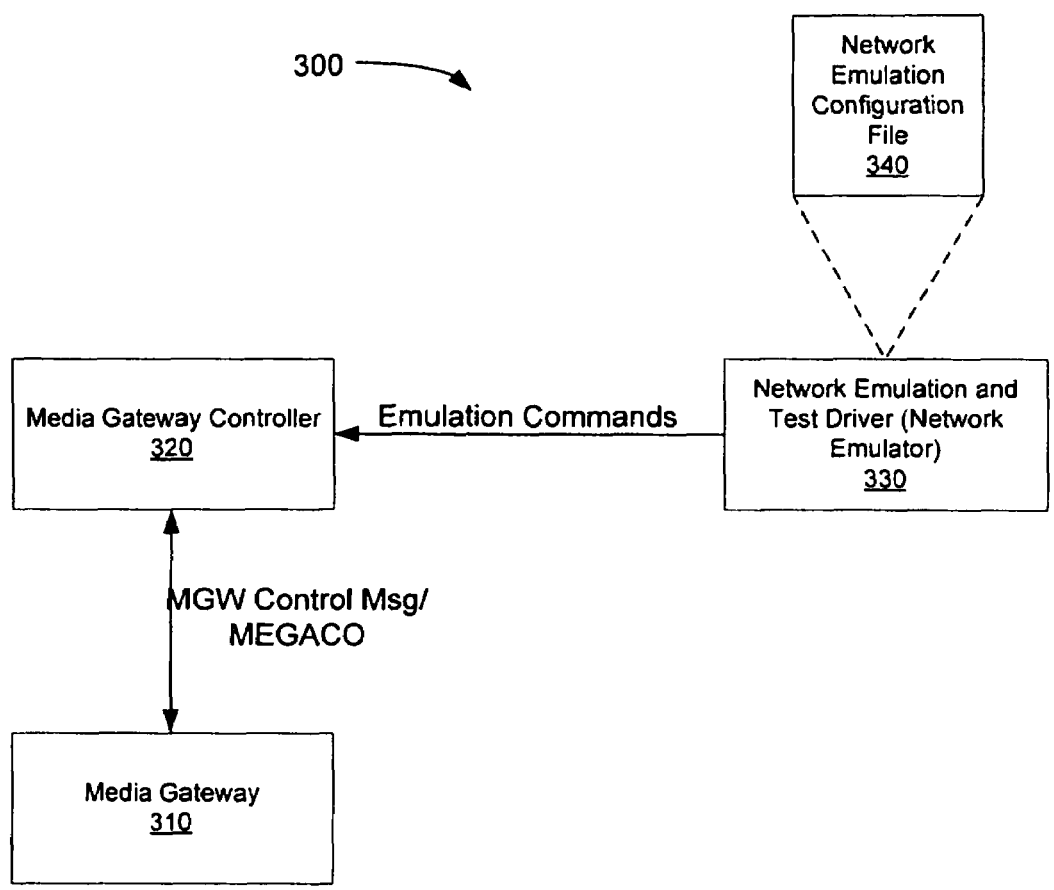
FIG. 3 is a diagrammatic representation of an embodiment of a configuration of interconnections between a media gateway, a media gateway controller, and a network emulator.

FIG. 3 is a diagrammatic representation of a configuration 300 of interconnections between a media gateway 310, a media gateway controller 320, and a network emulator 330. Network emulator 330 may be included in, or otherwise interface with, MGC 320. Network emulator 330 monitors for a specific condition to trigger a test call. The test call may be triggered in parallel with other test calls, in parallel with non-test calls, or in a single test call evaluation. For example, network emulator 330 may detect a particular data element that is assigned or allocated for test call purposes. In one implementation, a data element assigned for test call purposes may comprise a termination ID (TID). The termination ID may comprise an interface type, a group number, such as a span number, and a member number, such as a channel number. In other implementations, a data element assigned or allocated for test call purposes may comprise one or more other data elements, such as calling line identity (CLID), a called party telephone number, a calling party or called party network address, or another suitable data element that may be designated for test call purposes. Once the condition is detected, network emulator 330 provides a command that triggers call processing for the test call and causes the appropriate media control messages to be sent to the associated media gateway. From the perspective of media gateway 310, no distinction between a test call and a non-test call is required. That is, media gateway 310 processes a test call as directed by media gateway controller 320, and the test call appears as a "normal" call to the media gateway. Pursuant to providing a mechanism for emulating a converged network, MGW 310 may be configured such that a single test call is conveyed thereto as multiple inbound and outbound call traffic. In one implementation, feedback mechanisms are deployed on MGW 310 for returning outbound traffic of a test call to MGW 310 where the returned test call traffic is treated as a separate call by the MGW. In another implementation, test call traffic may be internally switched, e.g., via a MGW bus, from one media interface to another media interface to emulate multiple network components.

In accordance with embodiments described herein, normal call processing may be leveraged to trigger insertion of bearer connections with test-specific bearer attributes during call test procedures. Moreover, media gateway features may be tested in parallel with other test traffic and with normal call traffic processing by way of call evaluations performed by trigger-based mechanisms. A media gateway may be used to emulate a converged network comprising multiple types of network components such as wireless, wireline, such as PSTN, and packet, such as Internet protocol (IP), network components.

In accordance with embodiments disclosed herein, a media gateway may be configured to emulate a converged network to realistically test calls that emulate traversal across multiple media gateways of a converged network. Moreover, any number of bearer connections with any bearer types and attributes may be applied to a test call thereby providing an efficient mechanism to verify features deployed on a media gateway without using third-party MGC software. An arbitrary number of bearer connections with specific parameters may be inserted into a communications path that is otherwise conventionally allocated between two terminations across multiple media gateways. The insertion of bearer connections is triggered by the normal call processing function of a MGC when an originator's termination ID (or other data element) matches a TID (or other data element) allocated for test scenarios. A TID allocated for a test scenario may be referred to herein as a trigger termination or trigger TID. A test call comprises a trigger termination and a list or other data structure of bearer connections to be applied to the test call. Each bearer connection may be configured with specific bearer attributes.

Figure 4A:
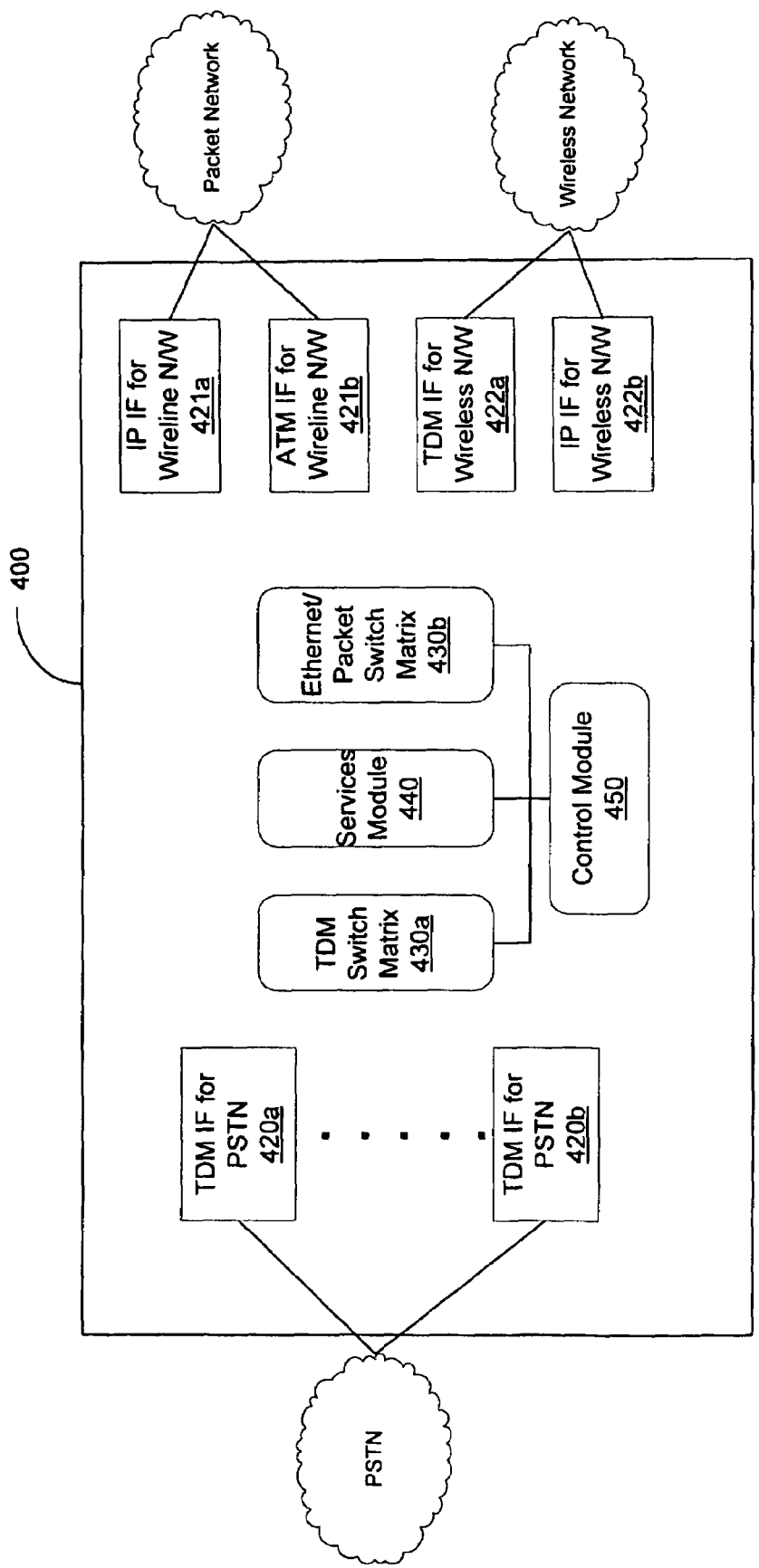
FIG. 4A is a diagrammatic representation of an embodiment of a media gateway that may be configured to emulate a converged network for media gateway and call testing.

FIG. 4A is a diagrammatic representation of an embodiment of a media gateway 400 that may be configured to emulate a converged network for media gateway and call testing. Media gateway 400 may include interfaces capable of connecting to wireless networks, packet networks, wireline networks, and/or other network systems, and each of the interfaces may be used to emulate a particular network type to facilitate realistic testing of connections and handoff between different types of networks.

Media gateway 400 comprises a converged media gateway. As referred to herein, a converged media gateway refers to a gateway adapted or otherwise configured to handle traffic—signaling and/or payload—of a plurality of network types, such as wireline, packet, and wireless traffic. To this end, media gateway 400 comprises three general interface card types: packet, wireline, and wireless interface cards. In the illustrative example, media gateway 400 includes wireline, e.g., PSTN, interface (I/F) cards 420a-420b, packet interface cards 421a-421b, and wireless interface cards 422a-422b the latter of which provides a packet interface to a wireless network In the illustrative example, media gateway 400 comprises a switching media gateway adapted to provide switching services. To this end, media gateway 400 includes two switching matrixes 430a-430b. In the present example, switching matrix 430a comprises a TDM switching matrix, and switching matrix 430b comprises a packet switching matrix.

TDM switching matrix 430a switches voice channels between TDM network interface cards 420a-420b and a service module 440. Packet switching matrix 430b switches packet channels between packet interface cards, such as interface cards 421a-421b, and service module 440. Packet switching matrix 430b may be implemented as an Ethernet or other packet switching fabric that may be capable of switching traffic between ports of packet-capable interfaces, such as ports of interface cards 421a-421b. In one exemplary implementation, packet switching matrix 430b may be implemented using a gigabit Ethernet switching fabric, such as those manufactured by Broadcom Corporation or Marvel Technology Group Limited. The specific implementation for switching matrix 430b may be selected based on design choice, the number of ports required by media gateway 400, or other factors.

Service module 440 may comprise various functional modules for handling various types of data types and formats. For example, service module 440 may include various voice chips, such as VoIP chips, voice-over-ATM adaptation Layer-1 (AAL1) chips, and voice-over-AAL2 chips, for processing of various voice data. For example, a VoIP chip deployed on service module 440 provides IP packetization of voice data, and voice-over-AAL1 and AAL2 chips provide segmentation and reassembly functions of various voice formats to or from ATM cells. In addition, each voice server includes digital signal processors (e.g., voice transcoders or Codecs, echo cancellers, conference bridges, etc.), a time slot interconnection (TSI), and a central processing unit (CPU). One or more voice chips may implement one or more VoIP protocols, such as Real time Transmission Protocol (RTP). In addition to various Codecs, conference bridges, echo cancellation functions, service module 440 may provide conversion between data in one packet format and data in another packet format, and between non-packetized, e.g., TDM, data to/from a packet format.

Packet switch matrix 430b may be connected to packet interfaces, such as ATM and IP interfaces. Media gateway 400 may be adapted to handle various packet formats. In the illustrative example, media gateway 400 is adapted to process packet data formatted in accordance with IP and ATM, although other packet formats may be supported in lieu of, or in addition to, IP and ATM. The depiction of media gateway 400 adapted to support IP and ATM formats is provided for illustrative purposes only and is chosen to facilitate an understanding of embodiments disclosed herein. IP network interfaces, such as interface cards 421a and 422b, each include functionality for sending and receiving media packets, such as voice packets, over IP. An interface of one packet format, such as ATM or IP, may be adapted to support connection to either a wireless or wireline network. For example, IP interface card 421a and 422b are respectively adapted to connect to a wireline IP network and a wireless IP network.

Figure 4B:
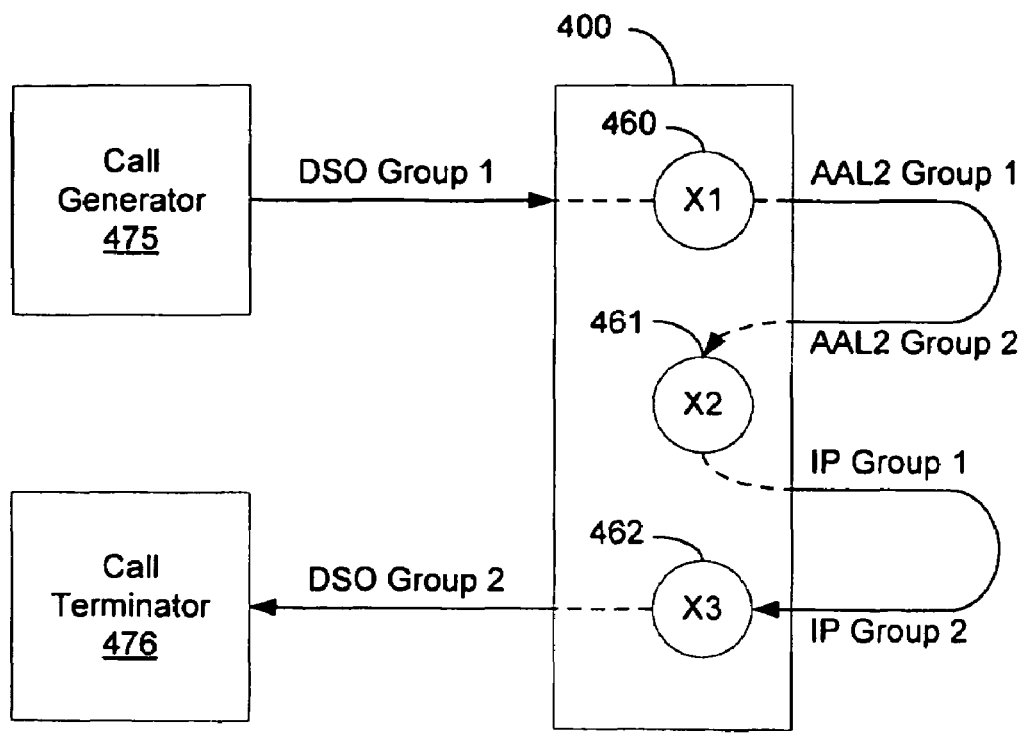
FIG. 4B is a diagrammatic representation of an embodiment of a logical configuration of a media gateway for emulating a converged network.

FIG. 4B is a diagrammatic representation of a logical configuration of media gateway 400 for emulating a converged network. In the illustrative example, media gateway 400 is configured with termination points 460-462 (illustratively designated X1-X3). Termination points 460-462 provide for emulation of a converged network having three media gateways. A test call may then be routed from one termination point to another termination point to emulate a call routed between media gateways of different networks.

A call generator 475 generates a test call that is conveyed to termination point 460 of media gateway 400. Call generator 475 may, for example, be implemented as a telephone or other communication device communicatively coupled with media gateway 400. Call generator 475 may be coupled with media gateway 400 by a local loop or other suitable interconnection. The test call is then routed from termination point 460 to termination point 461 and, in turn, from termination point 461 to termination point 462. In the illustrative example, the test call is then routed to a call terminator 476. Thus, the call origination from call generator 475, routing between the various termination points, and transmission of the call to a call terminator 476, may emulate a call routed through three media gateway. Call terminator 476, like call originator 475, may be implemented as a telephone or other communication device communicatively coupled with media gateway 400. In this illustrative example, a test call delivered from call generator 475 to media gateway 400, through termination points 460-462, and to call terminator 476 exhibits call characteristics and behaviors of a call that is routed through four distinct networks—one emulated network between call generator 475 and termination point 460 of media gateway 400, one emulated network represented by the outbound delivery of the test call from termination point 460 to termination point 461, one emulated network represented by the outbound delivery of the test call from termination point 461 to termination point 462, and a final emulated network represented by the outbound transmission of the test call from termination point 462 to call terminator 476.

Any variety of bearer characteristics or services may be applied on a connection between termination points, and a connection between termination points may be implemented in accordance with any network type supported by media gateway 400. In this manner, receipt of a test call formatted according to one network type at a termination point, and subsequent transmission of the call at the termination point, or another termination point, in a different network format provides for emulation of a call handoff from one network type, e.g., from a wireless network, to another network type, e.g., to a packet network.

Figure 4C:
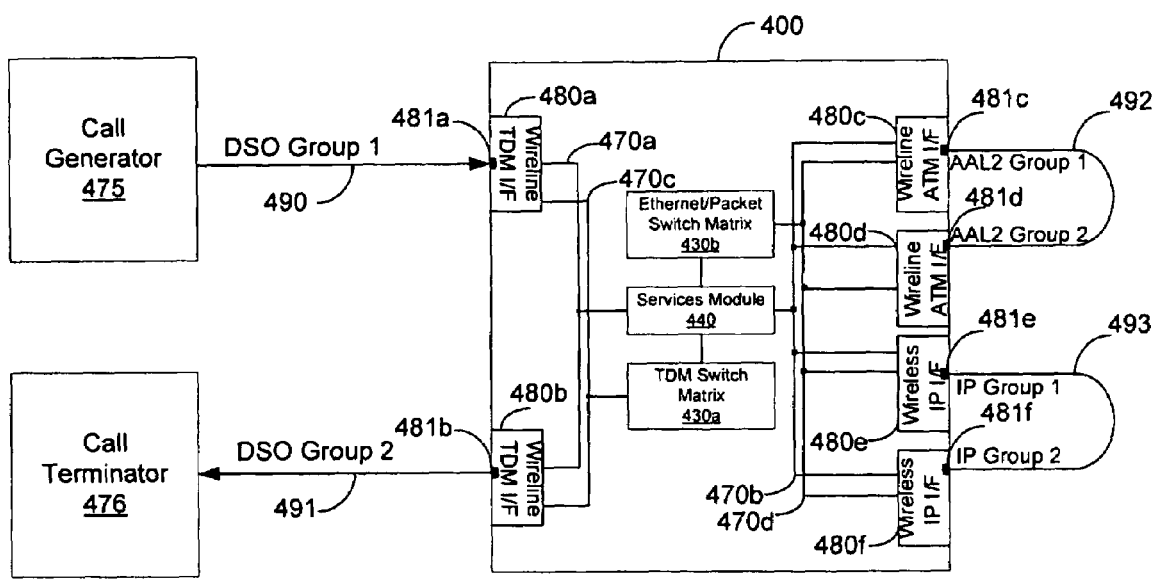
FIG. 4C is a diagrammatic representation of an embodiment of a media gateway depicted in FIG. 4B shown in a physical configuration for emulating a test call.

With reference now to FIG. 4C, a diagrammatic representation of an embodiment of media gateway 400 depicted in FIG. 4B is shown in a physical configuration for emulating a test call. In the present example, media gateway 400 is depicted in a configuration for emulating a call routed among four networks. Media gateway 400 includes various interface cards 480a-480f. In the present example, interface cards 480a-480b comprise wireline TDM interface cards, interface cards 480c-480d comprise packet interfaces implemented as wireline ATM interface cards, and interface cards 480e-480f comprise wireless IP interface cards. Media gateway 400 may be equipped with any number of interface cards of various network transmission types, and those shown are only illustrated to facilitate an understanding of embodiments disclosed herein.

In the illustrative example, interface cards 480a-480b are connected with service module 440 via an interconnect 470a, and interface cards 480c-480f are connected with service module 440 via an interconnect 470b. In a similar manner, interface cards 480a-480b are connected with TDM switch matrix 430a via a suitable interconnect 470c, and interface cards 480c-480f are connected with packet switch matrix 430b via an interconnect 470d. The configuration of interface cards 480a-480f and interconnects with service module 440 and switch matrices 430a and 430b are illustrative only. For example, each of interface cards 480a-480f may share a common interconnect with service module 440 or, alternatively, each of interface cards 480a-480f may each have a respective interconnect with service module 440. Interconnects 470a-470d may be implemented as, for example, one or more internal buses deployed on a backplane of media gateway 400.

Interface cards 480a-480f may each include one or more respective physical ports 481a-481f. Interface cards 480a-480f may comprise a plurality of physical ports, and a single port is shown on each of interface cards 480a-480f to simplify the illustration. Media gateway 400 may be configured for a test call evaluation by coupling one or more ports of one or more interface cards to provide call feedback to media gateway 400. In the present example, physical port 481c of interface card 480c is connected with physical port 481d of interface card 480d via a communication coupling 492, such as a conductive cable. In a similar manner, physical port 481e of interface card 480e is connected with physical port 481f of interface card 480f via a communication coupling 493.

A test call is generated by call generator 475 and conveyed to media gateway 400. In the illustrative example, a test call comprising a digital signal 0 (DS0) is generated by call generator 475 and transmitted to media gateway 400 via a communication medium 490, such as a T-carrier copper medium. The test call may be multiplexed on medium 490 and thus may be assigned a particular logical designation or channel assignment. In the illustrative example, the test call is carried on a channel allocated on medium 490 with a channel designation of "DS0 Group 1". On receipt of the test call by media gateway 400 at TDM interface card 480a, the test call may be conveyed to service module 440 via interconnect 470a. In the present example, assume that media gateway 400 processes the test call for transmission out media gateway 400 over a cell relay wireline network. In this instance, the test call may be encoded into ATM cells and thereafter conveyed to packet switch matrix 430b. Assume packet switch matrix 430b switches the ATM-formatted test call to wireline ATM interface card 480c for transmission out port 481c. In the present example, the ATM-formatted test call is output with a designation of "AAL2 Group 1". In this instance, the ATM-formatted test call is fed back to port 481d of wireline ATM interface card 480d via coupling 492. Notably, media gateway 400 does not recognize the test call as associated or otherwise related to the ATM test call output from interface card 480c. That is, from the processing perspective of media gateway 400, the test call that is fed back to media gateway 400 at interface card 480d appears to media gateway 400 simply as an inbound call received over a packet network. In the present example, the test call presented as inbound traffic at interface card 480d via feedback coupling 492 is designated "AAL2 Group 2".

The ATM-formatted test call may then conveyed to service module 440 via interconnect 470b. Assume that media gateway 400 processes the ATM-formatted test call for transmission over a wireless IP network. In this instance, the cells of the ATM-formatted test call are reassembled and then packetized into a suitable packet format, e.g., Internet Protocol (IP) packets. The packetized test call may thereafter be conveyed to packet switch matrix 430b. Assume packet switch matrix 430b switches the packetized test call to wireless IP interface card 480e for transmission out port 481e. In the present example, the packetized test call transmitted out interface card 480e has a designation "IP Group 1". In this instance, the packetized test call is fed back to port 481f of wireless IP interface card 480f via feedback coupling 493. In a similar manner as that described for the ATM feedback, media gateway 400 does not recognize the inbound packetized test call received at interface card 480f as associated or otherwise related to the test call output from interface card 480e. The test call that is fed back to media gateway 400 at interface card 480f appears to media gateway 400 simply as an inbound call received over a packet network. In the present example, the test call presented as inbound IP traffic at interface card 480f via feedback coupling 493 is designated "IP Group 2". The packetized test call may then be conveyed to service module 440 via interconnect 470b.

Assume that media gateway 400 processes the packetized test call for transmission over a TDM network. In this instance, the packets of the test call are reassembled and formatted for TDM transmission, e.g., formatted into an 8 kHz voice-frequency signal for transmission as a DS0 signal. The TDM test call is thereafter conveyed to TDM switch matrix 430a. Assume TDM switch matrix 430a switches the TDM test call to wireline TDM interface card 480b for transmission out port 481b. The TDM test call is then transmitted to call terminator 476 via communication medium 491. In the illustrative example, the TDM test call output from media gateway 400 via interface card 480b has a logical designation or channel assignment of "DS0 Group 2".

In the example described in FIG. 4C, processing of the test call emulates a call transmitted over four networks having three distinct network types. Particularly, transmission of the test call from call generator 475 to media gateway 400 emulates a call transmission over a TDM network to a first media gateway. Subsequent transmission of the test call out wireline ATM interface card 480c, over coupling 492, and to wireline ATM interface card 480d emulates a call routed from the first media gateway to a second media gateway over a wireline ATM network. In a similar manner, transmission of the test call from wireless IP interface card 480e to wireless IP interface card 480f via coupling 493 emulates a call transmission from the second media gateway to a third media gateway over a wireless IP network. Transmission of the test call from TDM interface card 480b to call terminator 476 over communication medium 490 emulates a call transmission from the third media gateway over a TDM network. Thus, the configuration of media gateway 400 depicted in FIGS. 4B and 4C provides for emulation of call transmission over a converged network including TDM, ATM, and wireless IP infrastructure.

Media gateway 400 may be configured to emulate a converged network for call processing evaluation with minimal hardware adaptation. In the illustrative example, media gateway 400 is physically configured for the above described test call scenario by simply coupling ports of interface cards 480c-480d and 480e-480f. In this manner, the test call supplied to media gateway 400 for call processing evaluation appears to the media gateway hardware as any other "normal" call. That is, media gateway processes and switches the test call in accordance with normal call switching mechanisms and is not aware that the test call is fed back to media gateway 400. For example, when media gateway 400 receives the test call at port 481d from the feedback mechanism, media gateway 400 only recognizes the test call as incoming call at card 480d and does not require any special hardware or software switching or processing adaptation for handling the test call. In a similar manner, when media gateway 400 receives the test call inbound at interface card 480f, media gateway 400 treats the test call as a normal inbound call.

It should be understood that the particular media gateway configuration depicted in FIG. 4C is illustrative only, and other configurations of media gateway 400 for emulating a converged network may be implemented. For example, a feedback mechanism may be terminated at two ports of a common interface card thereby reducing the requisite hardware for emulating a converged network. In such a configuration, a call may be transmitted out of a network interface card over a feedback coupling and subsequently received by the same interface card over the feedback coupling.

In other implementations, a media gateway may not require a physical feedback mechanism for implementing one or more embodiments disclosed herein. For example, multiple termination points may be specified for emulating a plurality of packet networks. In this instance, a packetized test call may be conveyed from packet switch matrix 430b to a packet interface card, and the packet interface card may return the packetized test call to a VoIP chip of service module 440. The packetized test call may then be processed for transmission over another emulated packet network, and may accordingly be transmitted to another (or the same) packet interface card. In this scenario, two termination points and transmission of a call therebetween may be made on a single media gateway without the use of a physical feedback mechanism.

Figure 4D:
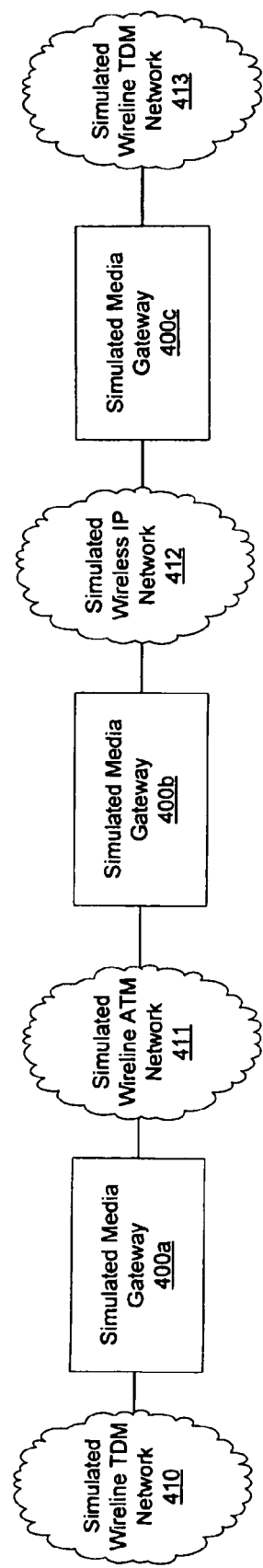
FIG. 4D is a diagrammatic representation of a converged network simulated by the configuration of the media gateway shown in FIGS. 4B and 4C.

FIG. 4D is a diagrammatic representation of a converged network simulated by the configuration of media gateway 400 shown in FIGS. 4B and 4C. In the present example, media gateway 400 depicted in FIG. 4B is configured to represent three simulated media gateways 400a-400c for a test call that simulates a call that is routed through four networks. In the present example, the test call provides a simulation of a call routed through a simulated wireline TDM network 410 to a media gateway 400a, through a simulated wireline ATM network 411 via media gateways 400a and 400b, through a simulated wireless IP network via media gateways 400b and 400c, and through a simulated wireline TDM network from media gateway 400c. The coupling of interface cards 480c and 480d via ports 481c and 481d via coupling 492 provides an effect of a connection between media gateways 400a and 400b over simulated wireline ATM network 411. In a similar manner, the coupling of interface cards 480e and 480f via ports 481e and 481f and communication medium 493 provides an effect of a connection between media gateways 400b and 400c over simulated wireless IP network 412.

Each of the simulated media gateways 400a-400c and simulated wireline and wireless networks 410-413 are emulated by the configuration of media gateway 400 depicted in FIGS. 4B and 4C. Thus, media gateway 400 advantageously provides a realistic test environment of a converged network and provides an effective platform for call processing and routing evaluation.

In accordance with embodiments disclosed herein, a configuration file or other data structure is associated with a call parameter, such as a TID, and defines a particular test call routing and bearer scenario. Test call triggers are defined to specify particular test call handling. For example, a configuration file that defines the test call depicted and described in FIGS. 4B and 4C includes instructions that define contexts for each of the TDM, ATM, and IP call routes. In this manner, any desired test call scenario may be defined in a configuration file and processed by media gateway 400 assuming the test call scenario is compliant with the supported network type and protocol set capabilities of media gateway 400.

Figure 5:
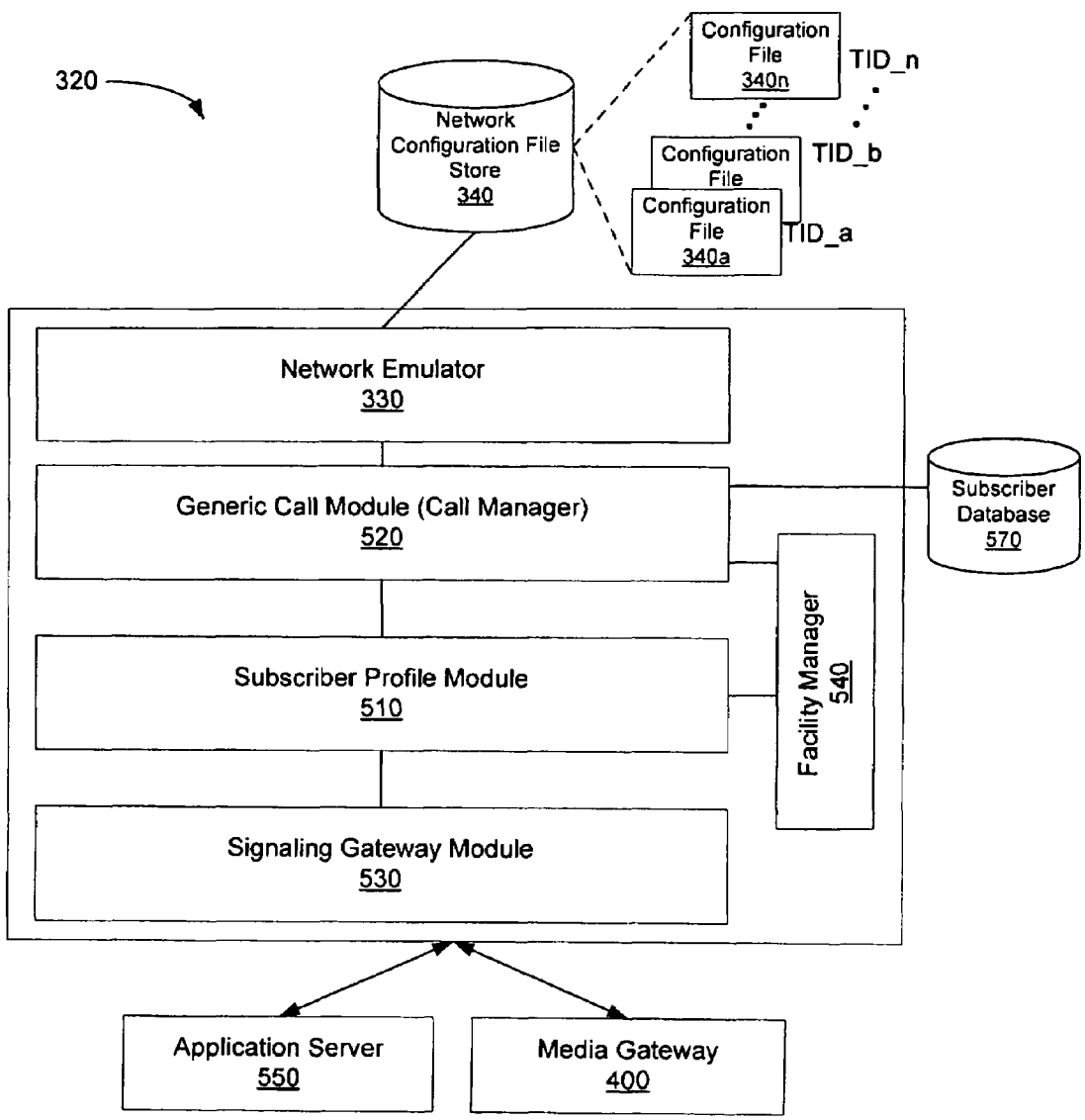
FIG. 5 is a diagrammatic representation of a configuration of a media gateway controller depicted in FIG. 3 that facilitates converged network emulation in accordance with embodiments disclosed herein.

FIG. 5 is a diagrammatic representation of a configuration of media gateway controller 320 depicted in FIG. 3 that facilitates converged network emulation in accordance with embodiments disclosed herein. MGC 320 may include one or more of various functional entities, such as, among others, a softswitch, a subscriber profile module 510, a call manager 520, a signaling gateway module 530, and a facility resource manager 540.

Subscriber profile module 510, or a subscriber profile manager function, may be configured to retrieve subscriber data for validation, e.g., at call origination and termination. To this end, subscriber profile module 510 may interface with a subscriber database 570. Subscriber profile module 510 may also, or alternatively, be configured to provide a framework for subscriber feature deployment and/or an application programming interface (API) for efficient application development and deployment. An evolution path to off-board advanced intelligent network (AIN) triggers may also, or alternatively, be provided by subscriber profile module 510. Subscriber profile module 510 may be associated with subscriber database 570 to directly retrieve subscriber and associated service feature information. Subscriber profile module 510 may be located on a dedicated, stand-alone data processing system, or may be integrated with additional functions or apparatus.

Call module 520, or a call manager function, may be configured to provide a generic, trigger-based, state-machine driven call model and to support distributed call processing. Call module 520 may be independent of external physical signaling interfaces and protocols, and may be configured to handle a variety of bearer traffic. In one embodiment, a system or network may have a minimum of two instances of call manager 520 to provide for call manager function fault tolerance. Some embodiments may not require or otherwise include a fixed association of a defined ratio between channels and the number of instances of call module 520. Call module 520 may also, or alternatively, facilitate or otherwise support call traffic distribution across all in-service processes or functions, and/or may be configured to provide or support call preservation, e.g., through evaluation of critical call information at call ringing and stable call states. Call manager 520 may be deployed on a dedicated, stand-alone processor or data processing system or, alternatively, may be integrated within a data processing system or telecommunications node that provides other functionality in addition to call manager functionality.

Signaling gateway module 530, or a signaling gateway manager function, may be configured to support Point Code operations, and may also, or alternatively, be configured to provide or support fault tolerance. Signaling gateway module 530 may comply with, enable compliance with, or otherwise support ITU standards, ANSI signaling standards, SIP, Megaco/H.248 and/or other gateway control protocols. Signaling gateway module 530 may be deployed on a dedicated, stand-alone processor or data processing unit or, alternatively, may be integrated with a data processing system or node that provides other functionality in addition to signaling gateway manager functions.

Facility manager 540 may be configured to provide trunk and line allocation service for call processing, handle non-call-associated signaling (e.g., an ISUP BLO messaging), and/or process requests to remove trunks or lines from service due to faults or manual intervention. Facility manager 540 may also, or alternatively, be configured to process requests regarding out-of-service trunks or lines and return the trunks or lines to service.

MGC 320 manages one or more media gateways 400 via any variety of standard protocols, such as MEGCO (Media Gateway Control), or other standard or proprietary protocols. In addition, MGC 320 may be connected to one or more application servers 550 to provide services like E911, CALEA and others. To facilitate emulation of a converged network with MGW 400, network emulator 330 may be deployed on MGC 320 and may interface with a network emulation configuration file store 340. Network emulation configuration file store 340 may include one or more configuration files 340a-340n that each respectively define a test call. For example, configuration files 340a-340n may each define routing, encoding, transport, and other characteristics of a particular test call scenario. Each of configuration files 340a-340n may be associated with, or include, a particular data element that facilitates recognition of a test call by MGC 320. In the present example, each of configuration files 340a-340n each include, or are otherwise associated with, a respective TID (illustratively designated TID_a-TID_n).

Figure 6:
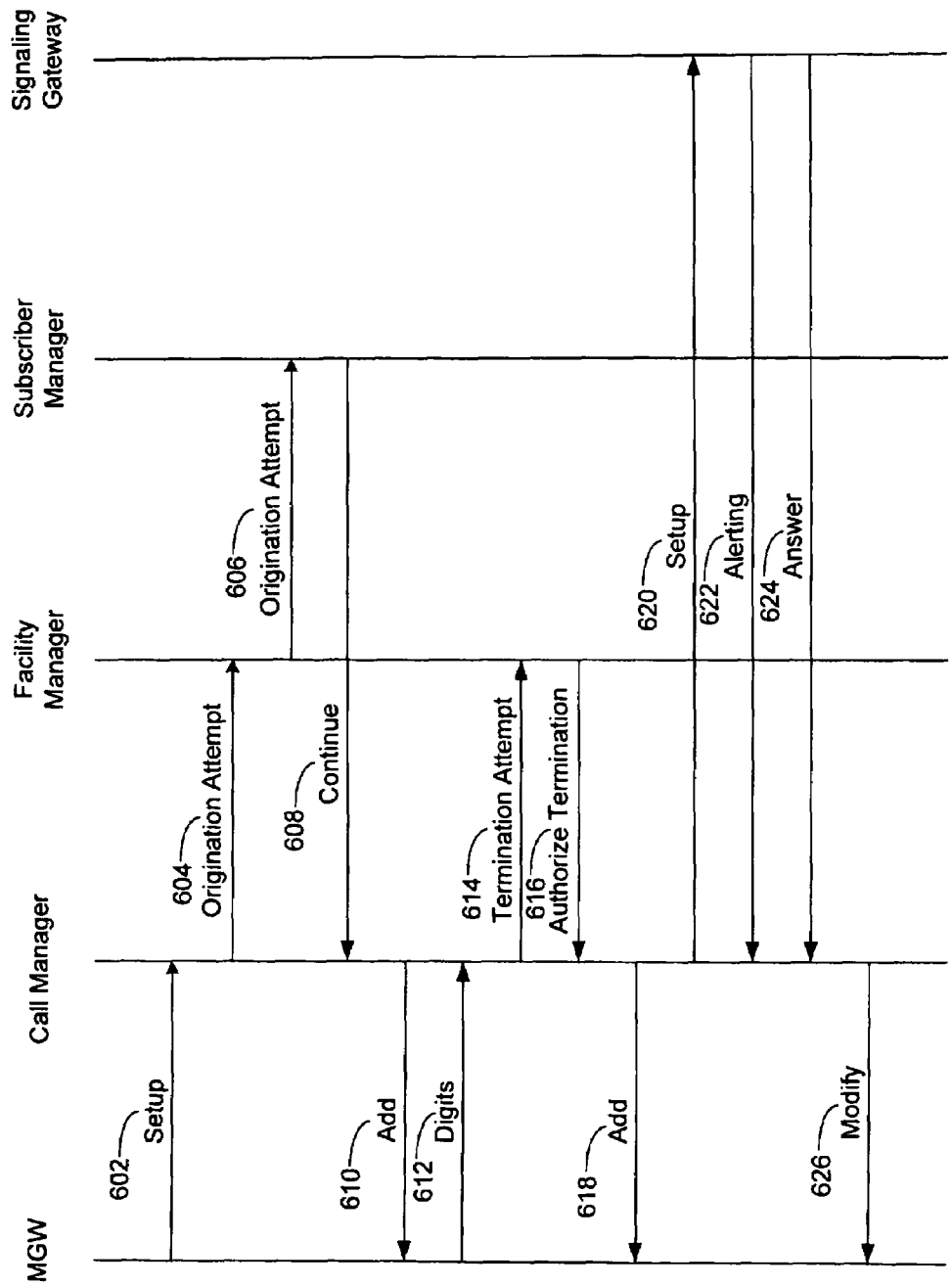
FIG. 6 is a diagrammatic representation of an exemplary call signaling flow among a media gateway and various media gateway controller components or functions that facilitates call set-up.

FIG. 6 is a diagrammatic representation of an exemplary call signaling flow among a MGW and various MGC components or functions that facilitates call set-up. Messages exchanged between a media gateway and the call manager may be either call control messages or media gateway control messages, such as MGCP. In response to detecting a subscriber that has gone offhook, the MGW sends a Set-up message 602 that comprises a call control message to the call manager. The Set-up message signals the call manager that a subscriber phone has gone offhook. An Origination Attempt message 604 may then be generated and transmitted from the call manager to the facility manager that, in turn, relays the Origination Attempt to the subscriber manager. The subscriber manager may then evaluate the origination attempt, e.g., interrogate subscriber database 570. Assuming the originator is a valid subscriber, the subscriber manage may return a Continue message 608 to the call manager that, in turn, generates and sends an "Add" message 610 to the MGW. Continue message 610 may include one or more subscriber data elements, such as a TID of the call originator that may be evaluated for determining whether the call is a test call. The Add message 610 may comprise a MGCP message that instructs the media gateway to create a switch context, apply a dial tone to the appropriate phone line, and prepare for collecting digits from the phone line. A "Digits" message 612 is sent from the MGW to the call manager and comprises a call control message that includes the collected dialed digits. A termination attempt message 614 may then be generated by the call manager and sent to the facility manger. The facility manger may then send an Authorize Termination message 616 to the call manager. The call manager may then generate and send an Add message 618 to the MGW that instructs the media gateway to add the outside trunk line to the context. The call manger may additionally generate and send a Set-up message 620 to the signaling gateway that instructs the signaling gateway to proceed with call set-up with the dialed party. The signaling gateway may then generate and send an Alerting message 622 to the call manger that notifies the call manager that the called party is being alerted. Assuming the called party answers the call, the signaling gateway may generate and send an Answer message 624 to the call manager when the called party goes offhook. In response to receipt of the Answer message, the call manger may generate and send a Modify message 626 to the MGW. The Modify message may comprises a MGCP message that instructs the media gateway to connect a bearer voice path between the phone line of the called party and an outside trunk to complete call establishment.

Figure 7:
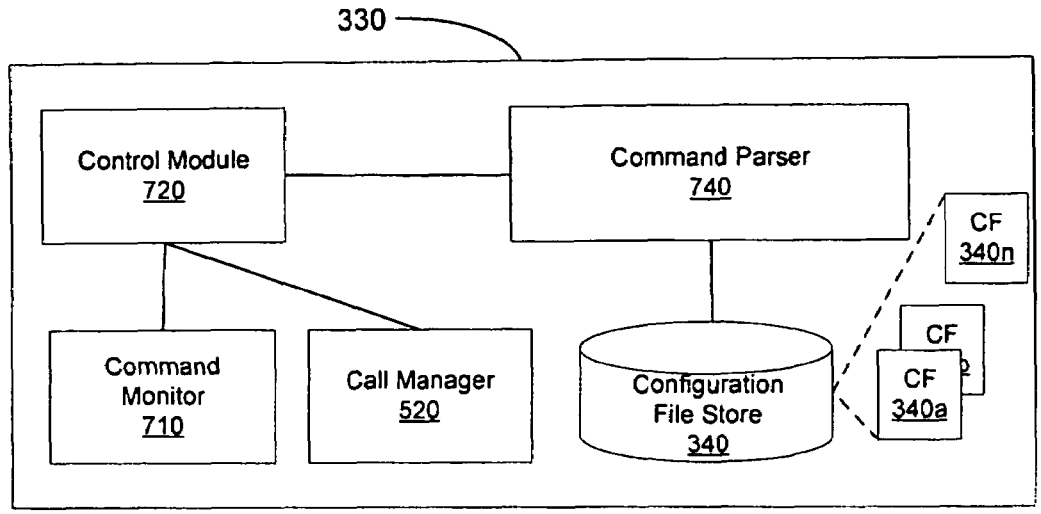
FIG. 7 is diagrammatic representation of a configuration of a network emulator that drives network emulation and testing in accordance with embodiments disclosed herein.

FIG. 7 is diagrammatic representation of a configuration of network emulator that drives network emulation and testing in accordance with embodiments disclosed herein. Network emulator 330 may be deployed or otherwise interface with MGC 320 depicted in FIG. 3. Network emulator 330 may include a command monitor 710 that monitors for particular test events. In accordance with embodiments disclosed herein, test events may be recognized by test "triggers" associated with a test call. Recognition of a test trigger by command monitor 710 provides an identification of a call as a test call. Command monitor 710, in response to recognition of one or more test triggers, may then respond to the test trigger event by invoking one or more test call procedures or routines of network emulator 330.

In accordance with an embodiment, a particular termination identifier (TID), referred to herein as a trigger TID, may be allocated for test call purposes. Command monitor 710 may monitor the TIDs of incoming calls. In the event that a TID of an incoming call matches a predefined trigger TID allocated for test purposes, command monitor 710 identifies the incoming call as a test call and may then invoke test call functions accordingly. As noted above, another data element may be allocated for test call purposes, and the description of a TID for use as a test call trigger invocation is provided to facilitate an understanding of embodiments disclosed herein.

Network emulator 330 may include a control module 720 that may be interfaced with command monitor 710. Additionally, network emulator 330 may include a command parser 740 that is interfaced with control module 720. Command parser 740 is additionally configured to retrieve a call configuration file (CF) 340a-340n from configuration file store 340 and parse commands included in the retrieved configuration file. Configuration file store 340 comprises a storage, such as a database or file storage maintained on a hard disk, memory device, or other suitable storage medium, that maintains a set of call configuration files 340a-340n. Each of configuration files 340a-340n may be associated with a particular test call routine. For example, each of configuration files 340a-340n may include, or otherwise be associated with, a particular predefined TID, or other suitable data element, allocated to a test call scenario. Additionally, command parser 740 may be configured to translate commands contained in a configuration file into a format suitable for processing by call manager 520. Command parser 740 may be interfaced with control module 720 for transmitting parsed call commands and parameters thereto. Control module 720 may be adapted to generate call control messages according to the call commands received thereby, and transmit the generated call control messages to a media gateway.

Network emulator 330 may be invoked independently or in conjunction with a MGC. In the latter case, a command line interface parameter or other suitable mechanism may be configured for a user to invoke network emulator 330.

Each configuration file 340a-340n defines a set of connections between termination points within a media gateway though which a test call is to be conveyed, behaviors of the test call during transmission across termination point connections, and associated bearer parameters and service features. In this manner, a configuration file 340a-340n defines end-to-end characteristics of the test call.

Configuring test call characteristics by way of configuration files 340a-340n provides for a highly flexible and configurable test call configuration mechanism as opposed to other options, such as hard coding a call testing route. In this manner, various network connections and conditions may be emulated by any variety of configuration files 340a-340n.

In accordance with an embodiment, a configuration file may have a variable number of specifiers that each defines one aspect of a test call. The particular number of specifiers may depend on the particular test call scenario that is defined by the configuration file.

In one implementation, the syntax of each specifier comprises a header with one or more parameters appended thereto. In an exemplary embodiment, specifiers defined in a configuration file may include: a mapping specifier, a termination specifier, and a media parameter specifier. Other specifiers, such as an event specifier that defines event time outs, may be included as well.

A mapping specifier defines a mapping between a physical and logical resource. In accordance with an embodiment, the mapping specifier is denoted by a header "M". The mapping specifier defines a logical-to-physical media gateway facility number mapping and, in an exemplary implementation, has the form:

M<logical, physical> where logical comprises a parameter value that specifies a logical media gateway facility number. The logical media gateway facility number may be specified as an integer value within a predefined range, e.g., 1-31. The physical parameter value may comprise an actual media gateway facility ID number. In the event that no mapping exists, the parameter of the mapping specifier may be interpreted as a physical ID.

A termination specifier defines a termination ID identifying a termination point at the media gateway for making a physical connection. In an exemplary embodiment, the TID may comprises an interface type, a group number (such as a span number), and a member number (such as a channel number). The termination specifier may be denoted by a header "T" An exemplary termination specifier format is as follows:

T<Node#, If_Type, Group, Member>

Node# is an optional parameter that comprises a value specifying a logical or physical media gateway node number. The If_Type parameter value defines an interface type. Example parameter values of If_Type may include: DS0_IF, AAL1_TRUNK_IF, AAL2_TRUNK_IF, VOIP_TRUNK_IF, AAL2_IF, UMTS_AAL2_IF, or any other suitable interface type. The Group parameter comprises a non-zero integer value that specifies a link, such as a T1-span number or other identifier. The Member parameter comprises a value selected from an available range, e.g., 1-4, 8-12, that may define a channel of the group. For example, the Member parameter may define a channel number or the mechanism for channel selection. Exemplary Member parameter values may be defined as follows:

="0"; the media gateway controller selects the test call channel

="−1"; unspecified, media gateway selects the test call channel

="−2"; loopback, use same channel as preceding termination

="−3" loopback, use same channel as trigger termination

An example of a termination specifier is as follows:

T<DS0_IF, 3701, 0>, <AAL2_IF, 8, −1>, <1, VOIP_TRUNK_IF, 10, −1>

In accordance with one embodiment, a first TID defined in a configuration file comprises the trigger TID for the configuration file and is allocated for test call purposes. If an origination termination ID matches the first TID defined in a configuration file, test call procedures may be invoked, and a test call is executed according to the configuration file. A TID allocated for test call purposes may comprise an If_Type, a Group, and a Member of a configuration file. In the event that a call originator's TID matches a TID of a configuration file, other terminations defined in the configuration file may be added to the call with parameters specified in the configuration file.

The media parameter specifier may define media bearer parameters. The media parameter specifier may include a header, such as "P". An exemplary media specifier format is as follows:

P<Descriptor [param1 (value) param2 (value) param3 (value) . . . ]> where the Descriptor has one or more parameter values that may specify call descriptions such as LOCAL_DESCR for local call description, DS0_RX_DESCR for a DS0 based call descriptor, AVD_RX_DESCR, UMTS_RX_DESCR, UMTS_CTM_DESCR for UMTS and CTM call types, TFO_LOCAL_DESCR, other bearer characteristics, service features, and the like.

Descriptor parameter (param) values may be, for example, assigned a value according to the following:

1. enumeration (e.g., UMTS_UP_MODE_TRANS)
   2. decimal (e.g., 2)
   3 hexadecimal (e.g., 0×45)

In one embodiment, Descriptor parameter values may be specified in a particular order. Parenthetical values following an enumeration with a value may be ignored. If a parameter value is not present, default (0) may be interpreted for the parameter value.

In accordance with an embodiment, multiple test routes may be supported. Multiple routes may be separated or otherwise designated with a delimiter, such as a "−" or other suitable character. Additionally, termination and media parameter specifiers may be delimited with a new line in the configuration file. Multiple media parameter specifiers may be specified per termination Identifier to support different control protocol descriptors.

An exemplary configuration file for emulating the test call discussed above with reference to FIGS. 4B and 4C is as follows:

```
Line 1   # Map logical MGW node 1 to physical MGW node 7, and
Line 2   # Map logical MGW node 2 to physical MGW node 8
Line 3   M<1, 7>
Line 4   M<2, 8>
Line 5   # First Context - TDM (trigger termination) to AAL2
Line 6   T<DS0_IF, 3701, 0>
Line 7   T<AAL2_IF, 9, 0>
Line 8   P<UMTS_CTM_DESCR [ UMTS_CTM_PREPARE (2)
Line 9   UMTS_TEXT_TRANSPORT_CTM (8) UMTS_TEXTPROT_VER_1 (1) 0]>
Line 10  P<AVD_RX_DESCR [ EC_128 EC_NO ]>
Line 11  # Second Context - AAL2 to VOIP
Line 12  #T<AAL2_IF, 10, -2>
Line 13  T<1, VOIP_TRUNK_IF, 2700, -1>
Line 14  P<UMTS_RX_DESCR [ UMTS_UP_MODE_SUPP UMTS_UP_VERSION_2
Line 15  UMTS_DEL_ERRSDU_YES UMTS_UP_INTF_TYPE_NB
Line 16  UMTS_UP_INIT_DIR_OUT INHIBIT_TRFO_NO { 0x86 0xff 0xff 0 8 } ]>
Line 17  #Third Context - VOIP to TDM (final termination)
Line 18  T<2, VOIP_TRUNK_IF, 2900, -1>
Line 19  P<UMTS_RX_DESCR [ UMTS_UP_MODE_SUPP UMTS_UP_VERSION_2
Line 20  UMTS_DEL_ERRSDU_YES UMTS_UP_INTF_TYPE_NB
Line 21  UMTS_UP_INIT_DIR_IN INHIBIT_TRFO_NO { 0x86 0xff 0xff
Line 22  0 8 } ]>
Line 23  P<UMTS_CTM_DESCR [ UMTS_CTM_PREPARE (2)
Line 24  UMTS_TEXT_TRANSPORT_CTM (8) UMTS_TEXTPROT_VER_1 (1) 0 ]>
```

Line numbers are included to facilitate a discussion of the exemplary configuration file. In the present example, a mapping specifier M<1, 7> provided on Line 3 provides an association of a logical media gateway of "1" to a media gateway with a facility ID of "7". In a similar manner, a mapping specifier of M<2, 8> provided on Line 3 provides an association of a logical media gateway of "2" with a media gateway having a facility ID of "8".

Next, the configuration file includes various statements that define a first call context at lines 5-10. In the illustrative example, Line 6 specifies that the test call is inbound on a DS0 interface on a link with a group number "3701". The termination specifier member parameter value "0" indicates that the media gateway controller selects the test call channel. The termination specifier parameters DS0_IF, 3701, and 0 comprise a trigger TID that is allocated for test call purposes, and a match between the trigger TID defined by the termination specifiers of Line 6 in the example configuration file with a call originator's TID results in invocation of test call procedures described herein in accordance with an embodiment. The termination specifier of Line 8 specifies that the test call is to be routed out of the media gateway on an ATM interface with a group value "9" and that the particular channel on which the test call is to be transmitted outbound from the media gateway is to be selected by the media gateway controller. Lines 8-10 define media parameter specifiers that define various media bearer parameters or characteristics of the test call for transmission outbound from the trigger termination. In the present example, the media parameter specifier of the first test call context specifies that the test call is to be transmitted in accordance with the UMTS standard and various characteristics thereof. First and second termination points specified by respective termination specifiers of lines 6 and 7, and the bearer characteristics specified by lines 8-10, provide for configuration of a connection between the two termination points and thus provide for emulation of a connection between two networks, namely a TDM and ATM network.

Next, the configuration file includes various statements that define a second call context at lines 11-16. In the illustrative example, the second call context comprises an inbound ATM call to voice over IP (VoIP) as specified at line 11. Line 12 specifies that the test call is inbound on an ATM interface with a group number "10". The termination specifier member parameter value "-2" indicates that the inbound test call channel of the second call context is the same as the previous termination. That is, the termination specifier member parameter indicates that the ATM test call is fed back on the same channel as the outbound ATM test call of the first termination. The termination specifier of Line 13 specifies that the test call is to be routed out of the media gateway having a node number "1" on a VoIP trunk interface with a group number "2700", and that the particular channel on which the test call is to be transmitted outbound from the media gateway is to be selected by the media gateway. Lines 14-16 include media parameter specifiers that define various media bearer parameters of the test call for transmission outbound from the media gateway. In the present example, the media parameter specifier of the second test call context specifies that the test call is to be transmitted in accordance with the UMTS standard and various characteristics thereof. Termination points specified by respective termination specifiers of lines 12 and 13, and the bearer characteristics specified by lines 14-16, provide for configuration of a connection between the two termination points and thus provide for emulation of a connection between two networks—in this instance, an ATM network and a wireless packet network.

Next, the configuration file includes various statements that define a third call context at lines 17-24. In the illustrative example, the third call context comprises an inbound VoIP to outbound TDM call as specified at line 17. Line 18 specifies that the test call is inbound to the media gateway having a node number of "2" on a VoIP interface with a group number "2900". The termination specifier member parameter value "-1" indicates that the inbound test call channel of the second call context is selected by the media gateway. Lines 19-24 define various media parameter specifiers that define various media bearer parameters of the UMTS test call.

Figure 8:
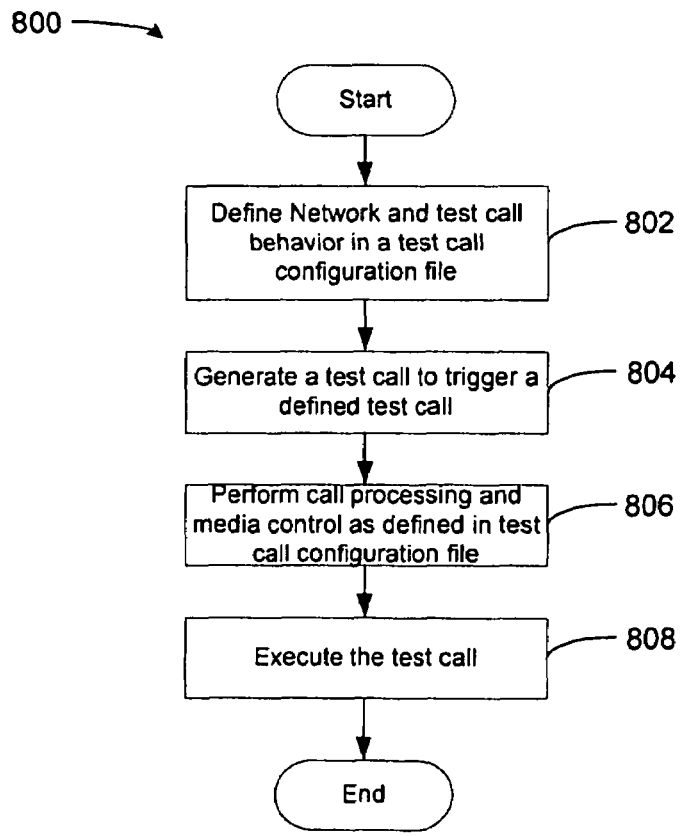
FIG. 8 is a flowchart depicting a high level flow of an embodiment for emulating a converged network in accordance with embodiments disclosed herein.

FIG. 8 is a flowchart 800 depicting a high level flow of an embodiment for emulating a converged network in accordance with embodiments disclosed herein. A call configuration file that defines the connections between termination points on a converged network for the call, bearer connection characteristics and parameters, and possibly a call duration is defined (step 802). A test call is then generated to trigger execution of the call defined in the call configuration file with a specific TID (step 804). The configuration file is then interpreted to define the test call behavior and call processing by the media gateway controller as defined in the call configuration file (step 806). The test call is then executed step-by-step, termination point-by-termination point as directed by the call controller on a media gateway that emulates a converged network (step 808). It should be understood that various message exchanges may be made between a MGW and a MGC for carrying out the test call in accordance with the configuration file.

Figure 9:
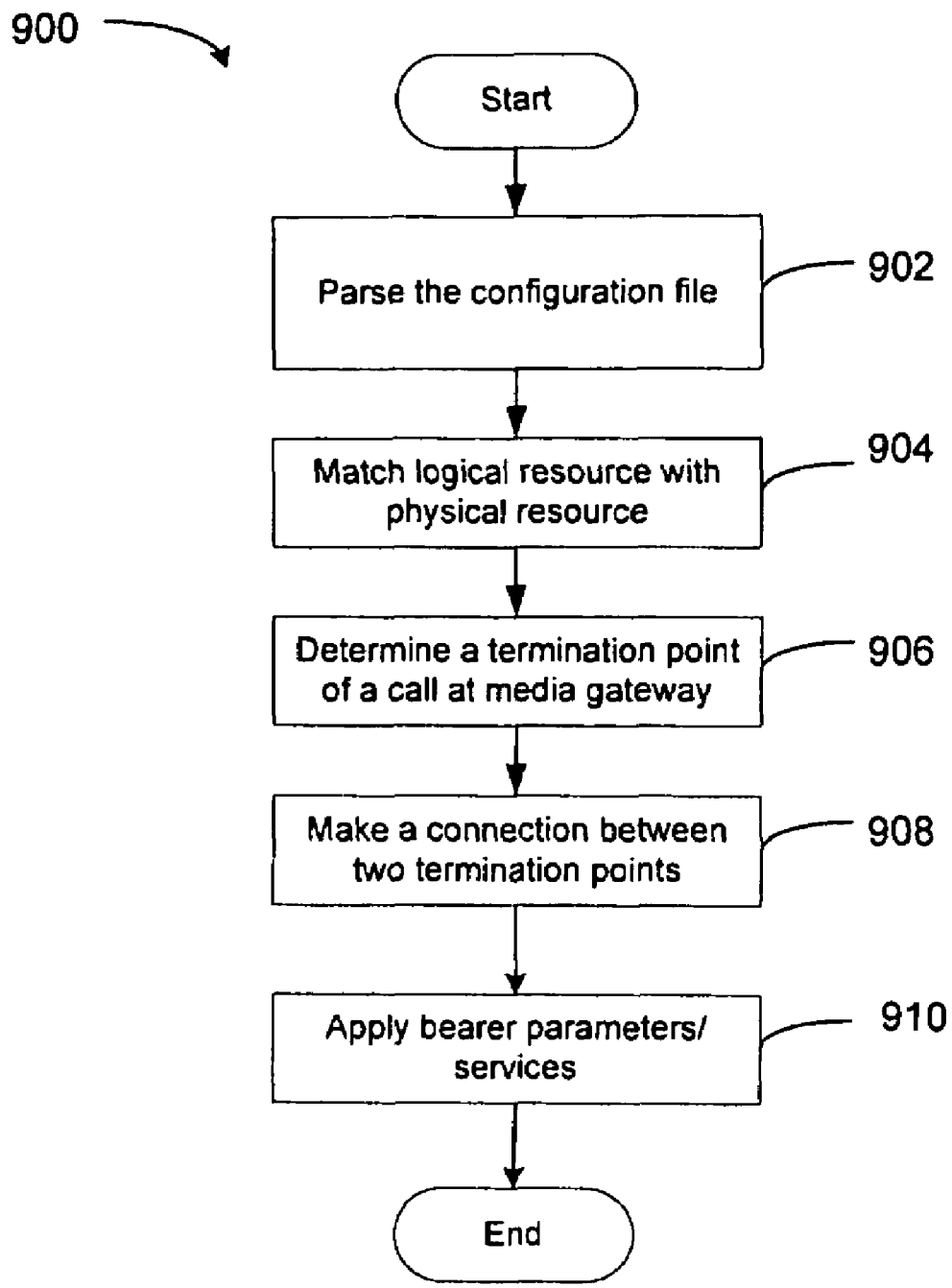
FIG. 9 is a flowchart depicting call processing and call execution of a test call in an emulated converged network in accordance with embodiments disclosed herein.

FIG. 9 is a flowchart 900 depicting call processing and call execution of a test call in an emulated converged network in accordance with embodiments disclosed herein. The processing steps of FIG. 9 generally depict processing of steps 806 and 808 shown in FIG. 8. First, the configuration file is parsed (step 902), and the logical resource ID defined in the call configuration file is translated into a physical ID (step 904). With the physical ID, a termination point is terminated (step 906), and a connection is then made with another termination point on the media gateway (step 908). Then bearer parameters and services, such as transcoder free operation (TrFO) for a UMTS call, echo cancellation for a VoIP call, adaptive multi-rate (AMR) compression, or the like, are applied to establish the call (step 910), and the test call may then be completed.

Figure 10:
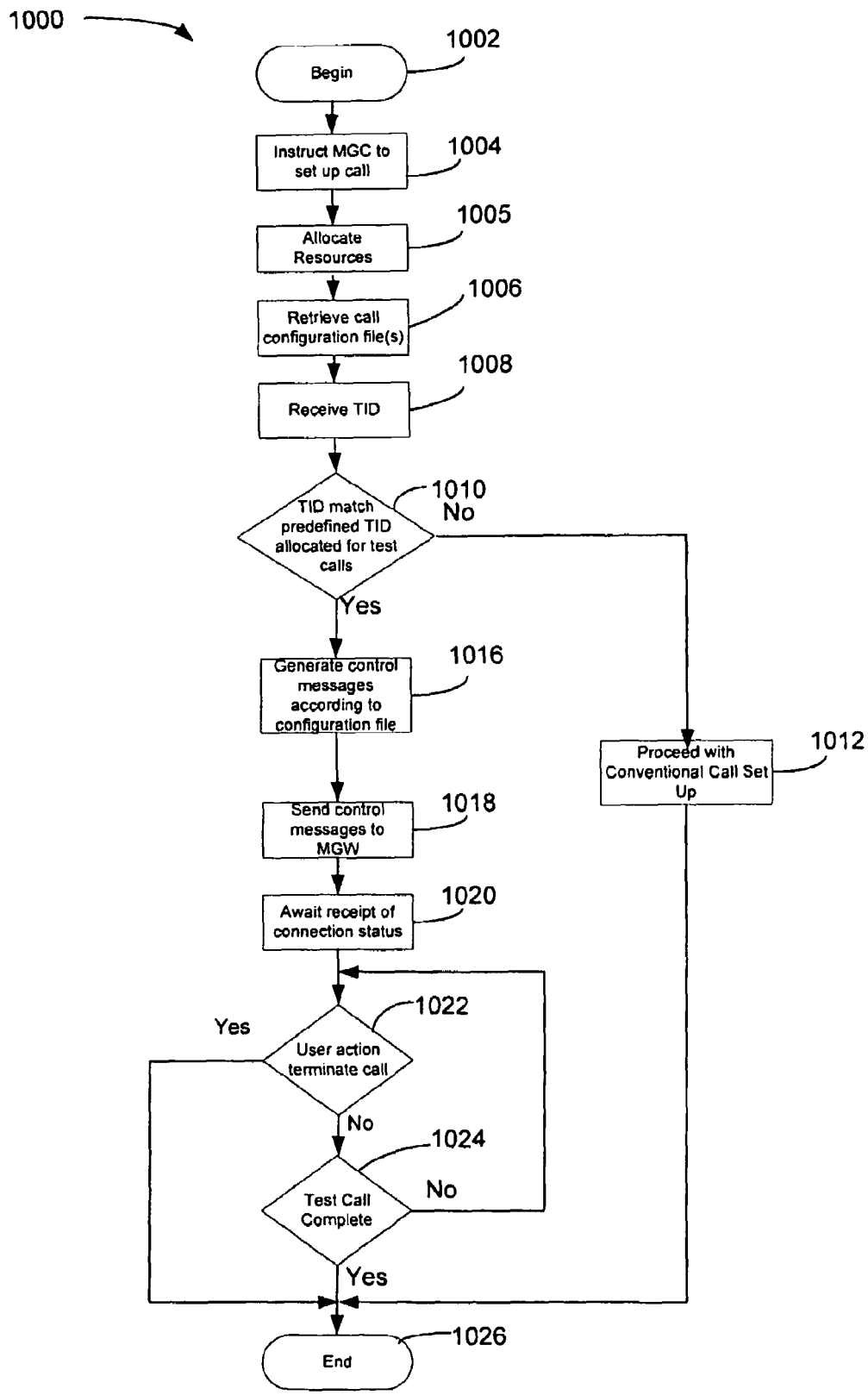
FIG. 10 is a flowchart depicting an embodiment of media gateway controller processing for detection of a test call and processing thereof.

FIG. 10 is a flowchart depicting processing of a media gateway controller for detection of a test call and processing thereof. Network emulator 330 is invoked (step 1002), and a signaling message that instructs MGC 320 to set-up a call is generated (step 1004). MGC 320, responsive to receipt and processing of the call set-up message, allocates resources for the call (step 1005). For example, the call manager 520 may negotiate with the facility manager to allocate a facility channel and/or other resources. Network emulator 330 may then retrieve configuration file(s) 340*a*-340*n* from configuration file store 340 (step 1006), and command monitor 710 may obtain the call originator's TID, or another suitable data element, for trigger evaluation (step 1008). On receipt of the call originator's TID, command monitor 710 may evaluate the TID to determine if it matches one of one or more predefined TIDs allocated for test calls (step 1010). For example, command monitor 710 may compare the TID of the call originator with a respective trigger termination of configuration files retrieved in step 1006. If the TID is not evaluated as a TID allocated for test calls, call set-up is processed in a conventional manner (step 1012), and the network emulator 330 cycle may end (step 1026).

Returning again to step 1010, in the-event that the call originator's TID is evaluated as matching a predefined TID allocated for a test call, network emulator 330 may then generate call control messages according to the configuration file identified as having a TID that matches the call originator's TID (step 1016), and the control messages are then sent to media gateway 310 (step 1018).

The media gateway, on receipt and processing of the control messages, may proceed with call set-up, including connecting with a particular port of a network interface specified in the configuration file, providing a dial tone and ringing signals as required by the call, and may perform other set-up functions required to set-up the call. The media gateway may then send a connection status message to the media gateway controller. On receipt of the connection status by network emulator 330 (step 1020), network emulator 330 may begin monitoring for call termination. For example, network emulator 330 may evaluate whether a user action, such as an on hook event, that terminates the test call has occurred (step 1022). If a user action that terminates the test call is identified, the test call procedure may terminate according to step 1026. If no user action that terminates the test call is identified at step 1022, network emulator 330 may evaluate whether processing of the test call has completed (step 1024). If the test call has not completed, the emulation routine may return to evaluate whether a user action has occurred that terminates the test call according to step 1022. Otherwise, the emulation routine may end according to step 1026.

The flowcharts of FIGS. 8-10 depict process serialization to facilitate an understanding of disclosed embodiments and are not necessarily indicative of the serialization of the operations being performed. In various embodiments, the processing steps described in FIGS. 8-10 may be performed in varying order, and one or more depicted steps may be performed in parallel with other steps. Additionally, execution of some processing steps of FIGS. 8-10 may be excluded without departing from embodiments disclosed herein. The illustrative block diagrams and flowcharts depict process steps or blocks that may represent modules, segments, or portions of code that include one or more executable instructions tangibly embodied on a computer-readable medium for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

As described herein, a system, method, and computer-readable medium for emulation of a converged network with a single media gateway are provided. In one embodiment, a method for emulating a converged network includes assigning a first termination point of a media gateway with characteristics of a first network, and assigning a second termination point of the media gateway with characteristics of a second network. A connection between the first and second termination points is configured, and a call is transmitted from the first termination point to the second termination point. In this manner, the connection between the two termination points emulates a connection between two networks. In accordance with another embodiment, a method of emulating a converged network comprises receiving, by a media gateway, a call at a first interface of a first network type. The call is processed for distribution on a second network type. The processed call is transmitted to a second interface of a second network type. A service module of the media gateway receives the processed call. In accordance with another embodiment, a method of emulating a converged network comprising receiving, by a media gateway controller, a call set-up message is provided. A data element associated with the call set-up message is obtained, and a determination of whether the data element is allocated for a test call is made. A configuration file associated with the data element is retrieved that specifies one or more parameters of the test call. Call control messages are generated according to the configuration file, and the call control messages are transmitted to a media gateway. In accordance with another embodiment, a system for emulating a converged network is provided. The system includes a media gateway controller having a call generator and a network emulator respectively implemented as computer-executable instructions, wherein the call generator generates a call that is transmitted by the media gateway controller. The system includes a media gateway adapted to switch communications among a plurality of network types and is communicatively coupled with the media gateway controller. The media gateway is configured with a plurality of network interfaces and may have a feedback mechanism for conveying the call from the media gateway back to the media gateway. In accordance with another embodiment, a computer-readable medium having computer-executable instructions for execution by a processing system for facilitating converged network emulation is provided. The computer-readable medium comprises instructions that monitor for a test event, and instructions that, responsive to detection of a test event, invoke a test call procedure. Instructions read a configuration file associated with the test event, and instructions generate one or more call control messages from the configuration file. The call control messages may then be transmitted to a media gateway.

Advantageously, a mechanism for implementing flexible test call evaluations is provided in which a single media gateway may be used for emulating a converged network. Implementations of embodiments disclosed herein provide effective emulation of call transmissions across a plurality of network types via a single media gateway. Any variety of call scenarios, including call transmissions across a plurality of network types, may be defined by respective configuration files, and realistic testing of the call scenarios may be made with a single media gateway. Accordingly, a realistic test environment may be implemented with minimal network components.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A method of emulating a converged network, the method comprising:
at a media gateway:
receiving, at a first interface, a test call of a first network type;
processing the test call for distribution on a second network type;
transmitting the processed test call to a second interface of the second network type; and
receiving, by way of a feedback mechanism coupled with the second interface for conveying the test call from the media gateway back to the media gateway, the processed test call, wherein the feedback mechanism includes ports of the first and second interfaces that are connected to each other, wherein the feedback mechanism returns outbound traffic of the test call from the media gateway to the media gateway, and wherein the returned test call traffic is treated as a separate call by the media gateway.

2. The method of claim 1, wherein the feedback mechanism is coupled with the second interface and a third interface of the media gateway.

3. The method of claim 1, wherein the feedback mechanism is coupled with a first port of the second interface and a second port of the second interface.

4. The method of claim 1, wherein the first network type and the second network type are respectively selected from the group consisting of a wireless network type, a public switched telephone network type, and an Internet protocol network type.

5. A method of emulating a converged network, comprising:
receiving, by a media gateway controller, a call set-up message;
obtaining a data element associated with the call set-up message;
determining the data element is allocated for a test call;
retrieving a configuration file associated with the data element that specifies one or more parameters of the test call;
generating call control messages according to the configuration file that instruct a media gateway to use a feedback mechanism connecting a first network interface of the media gateway and having a first network type to a second interface of the media gateway and having a second network type, wherein the feedback mechanism includes ports of the first and second interfaces that are connected to each other, wherein the feedback mechanism returns outbound traffic of the test call from the media gateway to the media gateway, and wherein the returned test call traffic is treated as a separate call by the media gateway; and
transmitting the call control messages to the media gateway.

6. The method of claim 5, wherein obtaining the data element comprises obtaining a termination identifier.

7. The method of claim 5, wherein retrieving a configuration file further comprises retrieving a configuration file that specifies one of more of a mapping between a physical and logical resource, a termination identifier identifying a termination point at the media gateway for making a physical connection, and media bearer parameters.

8. The method of claim 5, wherein the data element comprises an interface type, a group number, and a member number of an originator of the call set-up message, and wherein determining the data element is allocated for a test call comprises determining the interface type, the group number, and the member number match a termination identifier of a trigger termination specified in the configuration file.

9. A system for emulating a converged network, the system comprising:
a media gateway controller having a call generator and a network emulator respectively implemented as computer-executable instructions, wherein the call generator generates a test call that is transmitted by the media gateway controller; and a media gateway adapted to switch communications among a plurality of network types and communicatively coupled with the media gateway controller, wherein the media gateway is configured with a plurality of network interfaces and has a feedback mechanism for conveying the test call from the media gateway back to the media gateway, wherein the feedback mechanism includes ports of the first and second interfaces that are connected to each other, wherein the feedback mechanism returns outbound traffic of the test call from the media gateway to the media gateway, and wherein the returned test call traffic is treated as a separate call by the media gateway.

10. The system of claim 9, wherein the feedback mechanism comprises a physical coupling.

11. The system of claim 9, wherein the plurality of network interfaces comprises two or more interface cards selected from the group consisting of a wireless network interface card, a packet network interface card, and a wireline network interface card.

12. The system of claim 9, wherein the network emulator includes a command monitor module that monitors for a test event and, in response to recognition of a test event, invokes a test call procedure.

13. The system of claim 12, wherein the test event comprises identifying a match between a termination identifier of the call and a termination identifier allocated for test calls.

14. The system of claim 13, further comprising a configuration file storage interfaced with the network emulator, wherein the network emulator reads a configuration file associated with the termination identifier from the configuration file storage.

15. The system of claim 14, wherein the network emulator further comprises a command parser and a control module, wherein the command parser is adapted to parse commands from the configuration file and transmit the commands to the control module, and wherein the control module is adapted to generate call control messages in accordance with the parsed commands and transmits the control messages to the media gateway.

16. A computer-readable medium having computer-executable instructions for execution by a processing system, the computer-executable instructions for facilitating converged network emulation, comprising:

at a media gateway:

instructions that monitor for a test event;

instructions that, responsive to detection of a test event, invoke a test call procedure;

instructions that read a configuration file associated with the test event;

instructions that generate one or more call control messages from the configuration file, wherein the call control messages instruct a media gateway to use a feedback mechanism connecting a first network interface of the media gateway and having a first network type to a second interface of the media gateway and having a second network type, wherein the feedback mechanism includes ports of the first and second interfaces that are connected to each other, wherein the feedback mechanism returns outbound traffic of the test call from the media gateway to the media gateway, and wherein the returned test call traffic is treated as a separate call by the media gateway; and instructions that transmit the one or more call control messages to the media gateway.

17. The computer-readable medium of claim 16, wherein the test event comprises identifying a match between a termination identifier of a call and a termination identifier allocated for a test call.

18. The computer-readable medium of claim 17, wherein the configuration file includes a plurality of contexts each defining bearer characteristics of a respective termination of the call.

19. The computer-readable medium of claim 18, wherein each of the plurality of contexts comprises bearer characteristics selected from the group consisting of wireless bearer characteristics, wireline bearer characteristics, and packet bearer characteristics.

20. The computer-readable medium of claim 16, wherein the instructions that read the configuration file further comprise instructions that read the configuration file from a configuration file storage maintaining a plurality of configuration files each respectively defining a test call.

21. The computer-readable medium of claim 16, further comprising instructions that generate a call and transmit the call to the media gateway, wherein the call is processed according to the control messages.

22. A method for emulating a converged network, comprising:

at a media gateway:

assigning a first termination point with characteristics of a first network;

assigning a second termination point with characteristics of a second network;

configuring a connection, by way of a feedback mechanism for conveying a test call from the media gateway back to the media gateway, between the first and second termination points, wherein the feedback mechanism includes ports of the first and second interfaces that are connected to each other; and transmitting the test call from the first termination point to the second termination point using the feedback mechanism, wherein the feedback mechanism returns outbound traffic of the test call from the media gateway to the media gateway, and wherein the returned test call traffic is treated as a separate call by the media gateway.

23. The method of claim 22, wherein the characteristics of the first network comprise one or more wireline network bearer characteristics selected from the group consisting of a codec, bandwidth, and echo cancellation, and wherein the characteristics of the second network comprise one or more wireless network bearer characteristics selected from the group consisting of transcoder free operation, adaptive multi-rate speech compression type, and echo cancellation.

24. The method of claim 22, wherein the first termination point is configured with wireless network bearer characteristics, and wherein transmitting the call from the first termination point to the second termination point emulates a wireless network handoff.

* * * * *

UNITED STATES PATENT AND TRADEMARK OFFICE
CERTIFICATE OF CORRECTION

PATENT NO. : 7,616,740 B2
APPLICATION NO. : 11/430641
DATED : November 10, 2009
INVENTOR(S) : Chen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 66 days.

Signed and Sealed this

Nineteenth Day of October, 2010

David J. Kappos
*Director of the United States Patent and Trademark Office*